(12) United States Patent
Connolly et al.

(10) Patent No.: US 12,120,398 B1
(45) Date of Patent: Oct. 15, 2024

(54) METHODS AND SYSTEMS FOR LIVESTREAMING AUDIENCE-INFLUENCED CONTENT

(71) Applicant: Verizon Patent and Licensing Inc., Basking Ridge, NJ (US)

(72) Inventors: Scott Connolly, Lake Arrowhead, CA (US); Andrew Zarick, Los Angeles, CA (US); Wes Hovanec, Scarsdale, NY (US); Aaron Kaminar, Culver City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/125,990

(22) Filed: Mar. 24, 2023

(51) Int. Cl.
*H04N 21/4788* (2011.01)
*G06T 11/60* (2006.01)
*H04N 21/2187* (2011.01)
*H04N 21/488* (2011.01)

(52) U.S. Cl.
CPC ......... *H04N 21/4788* (2013.01); *G06T 11/60* (2013.01); *H04N 21/2187* (2013.01); *H04N 21/488* (2013.01)

(58) Field of Classification Search
CPC ........... H04N 21/4788; H04N 21/2187; H04N 21/488; G06T 11/60
See application file for complete search history.

(56) References Cited

U.S. PATENT DOCUMENTS

| | | | |
|---|---|---|---|
| 2018/0183844 A1* | 6/2018 | Danker | H04N 21/4756 |
| 2022/0408122 A1* | 12/2022 | Khanna | H04N 21/4788 |
| 2024/0078877 A1* | 3/2024 | Aru | G07F 17/3213 |

* cited by examiner

*Primary Examiner* — Oschta I Montoya

(57) ABSTRACT

An illustrative audience-influenced livestreaming system may provide, to an audience, livestream content depicting a live event and a feedback forum associated with the livestream content and by way of which feedback is submitted by the audience during the live event. The audience-influenced livestreaming system may also identify and track instances of a predesignated feedback token within the feedback submitted by the audience, and may generate a graphical representation of the instances of the predesignated feedback token. The audience-influenced livestreaming system may generate the livestream content by integrating video content depicting the live event with the graphical representation of the instances of the predesignated feedback token. Corresponding methods and systems are also disclosed.

20 Claims, 8 Drawing Sheets

METHODS AND SYSTEMS FOR LIVESTREAMING AUDIENCE-INFLUENCED CONTENT

BACKGROUND INFORMATION

Media content depicting various types of live events may be broadcast to an audience interested in viewing the events in real time as they are occurring. For example, musical presentations (e.g., concerts, etc.), sporting events, news coverage, reality shows, promotional events, and various other types of content may all be desirable for audiences to view live. To this end, livestreaming technologies have been developed to allow content (e.g., video, audio, etc.) captured at one location to be transmitted for viewing by an audience that is distributed to various other locations (e.g., in their homes, workplaces, etc.). Such technologies have made it possible and convenient for audiences to view live content while allowing content creators and subjects featured in the content (e.g., performers, athletes, etc.) to reach wider audiences with their content. A challenge that remains in spite of the technical possibilities, however, is that the dynamic that exists between performers and a widely-distributed audience may be significantly different than a conventional dynamic enjoyed by performers and in-person audiences. For example, an interactive element in which performers feel and take in energy and excitement from an engaged audience may be absent when a part or an entirety of the audience is not actually present at the venue where the live event is taking place. Such an altered dynamic may detract from a livestreamed event both for the subjects involved in putting on the event (performers, players, etc.) and the audience viewing the event.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
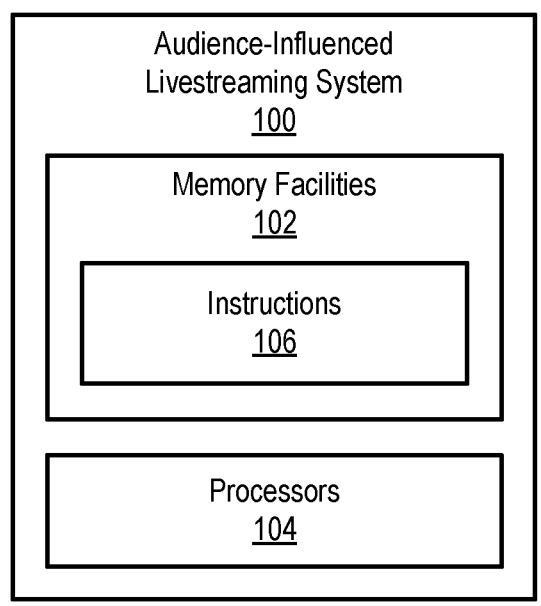
FIG. 1 shows an illustrative audience-influenced livestreaming system for livestreaming audience-influenced content in accordance with principles described herein.

Methods and systems for livestreaming audience-influenced content are described herein. As mentioned above, while livestreaming technologies would allow many live events to be experienced by partially or fully remote audiences (rather than the audiences needing to attend the events or otherwise be present in person), certain aspects of the traditional live-performance dynamic may be lost or degraded to some degree in these situations. For example, for performers who rely on audience engagement (e.g., volume of audience applause, enthusiastic behavior of visible audience members, etc.) to sense when they are performing well and/or to gain energy and excitement helpful for performing at their best, it may be difficult to perform to smaller in-person audiences or completely remote audiences in situations when part or all of the audience is viewing the performance remotely using livestream technologies.

To address these challenges while also adding additional elements of interest and other benefits for audiences, methods and systems described herein relate to livestream content that is "audience-influenced." As will be described in more detail below, audience-influenced livestream content may refer to content that is transmitted in real time (e.g., with small or no appreciable latency or delay) to viewers remote from where events depicted by the content are taking place, and that is also influenced by feedback from these viewers in the ways described herein. In some implementations, for example, audience-influenced livestreaming content may be gamified so as to allow audience feedback to influence what is presented in the content (e.g., instantaneous graphical representations of viewer feedback, etc.), influence what segment of the event is occurring or will subsequently occur (e.g., selecting what song to play next during a concert, etc.), influence whether a goal or other object of a game has been achieved (including a corresponding change to the aesthetic of the production indicative of that achievement, etc.), and so forth.

As one example, a live event such as a musical presentation (e.g., a pop concert featuring a singer and a band) may involve a set list (i.e., a list of songs to be performed) that could be progressed through based on feedback received from an audience that is viewing the concert remotely. The concert may take place in a studio or a venue capable of hosting only part of the interested audience and may be livestreamed by way of an interactive livestreaming platform to the geographically-distributed at-home audience. The livestreaming platform may provide a feedback forum (e.g., a live chat function, etc.) in which comments by individual audience members may be shared. Rather than viewers just seeing one another's comments in the chat, however, the presentation of the livestream content may be influenced in real time by the audience feedback. For example, the livestream content may indicate a target number of instances of a particular type of token (e.g., a particular string of text, a particular emoji or emote, etc.) that the audience is to provide in the chat, or may indicate another such gamified goal for the audience to try to achieve. As the audience then works toward that goal together (e.g., posting instances of the predesignated feedback token, etc.), the livestream content may show individual tokens that are being received, as well as the audience's overall progress toward the goal in real time. When the goal is reached, an aesthetic of the presentation may change (e.g., virtual fireworks or other lighting effects may be added to the livestream content, etc.) to indicate the accomplishment of the goal to the audience.

Additionally, the singer and other band members may also be apprised of each instance of the predesignated feedback token that is posted (e.g., by the tokens being instantly shown on an LED wall or other video display in the event space where the performance is taking place, etc.) to help the performers also feel the excitement that the audience is expressing (e.g., analogous to hearing the swell of applause or seeing fans cheering excitedly). In this way, the band may be more motivated and energized by the audience than they would be otherwise, the audience members may feel more connected to one another and to the band and the musical performance that is happening, and the entire production may be more entertaining and enjoyable for all involved due to the gamified elements and the cohesive sense of sharing and achieving common goals.

Along with the additional enjoyment that performers and audiences may gain (as has been described and as will be made more apparent below), methods and systems described herein for livestreaming audience-influenced content may further provide and be associated with various technical benefits. For example, as will be described, ultra-low latency provided by 5G networking technologies, as well as multi-access edge computing (MEC) and other low-latency cloud computing technologies, may allow end-to-end response time to be greatly reduced (e.g., so as to be perceived by the audience as instantaneous) in the livestreaming of audience-influenced content described herein. More particularly, when livestreaming is performed using systems and methods described herein, data may be carried and processed by 5G networks configured to carry communications end-to-end without long delays (e.g., to move from a carrier network to other Internet networks and back) and without unnecessarily long trip lengths (e.g., since MEC computing allows data processing to be done close to the network's edge where data is generated or consumed). As another technical benefit, methods and systems described herein to be implemented using 5G networks and other technologies described herein may facilitate various layers of efficiency including improved battery life, video delivery efficiency, and so forth. Production efforts and costs may also be reduced as technologies described herein (e.g., increased bandwidth at 5G speeds, reduced latency, network edge processing of data, etc.) allow high-quality and immersive productions to be created with minimal crews and IT support.

Various specific implementations will now be described in detail with reference to the figures. It will be understood that the specific implementations described below are provided as non-limiting examples and may be applied in various situations. Additionally, it will be understood that other examples not explicitly described herein may also fall within the scope of the claims set forth below. Methods and systems for livestreaming audience-influenced content may provide any or all of the benefits mentioned above, as well as various additional and/or alternative benefits that will be described and/or made apparent below.

FIG. 1 shows an illustrative audience-influenced livestreaming system 100 ("system 100") for livestreaming audience-influenced content in accordance with principles described herein. System 100 may be implemented by computer resources such as processors, memory facilities, storage facilities, communication interfaces, and so forth, implemented on one or more computing systems described in more detail below. In some examples, system 100 (or components thereof) may be implemented by MEC server systems operating on a provider network (e.g., a 5G cellular data network or other carrier network, etc.), cloud compute server systems running containerized applications or other distributed software, on-premise server systems, user equipment devices, or other suitable computing systems as may serve a particular implementation.

System 100 may include memory resources configured to store instructions, as well as one or more processors communicatively coupled to the memory resources and configured to execute the instructions to perform functions described herein. For example, a generalized representation of system 100 is shown in FIG. 1 to include memory facilities 102 and processors 104 selectively and communicatively coupled to one another. Memory facilities 102 and processors 104 may each include or be implemented by computer hardware that is configured to store and/or execute computer software. Various other components of computer hardware and/or software not explicitly shown in FIG. 1 (e.g., networking and communication interfaces, etc.) may also be included within system 100. As will be further illustrated in embodiments described below, memory facilities 102 and processors 104 may, in certain examples, be distributed between multiple computing systems and/or multiple locations as may serve a particular implementation.

One or more memory facilities 102 may store and/or otherwise maintain executable data used by one or more processors 104 to perform any of the functionality described herein. For example, memory facilities 102 may store instructions 106 that may be executed by processors 104. Memory facilities 102 may be implemented by one or more memory or storage devices, including any memory or storage devices described herein, that are configured to store data in a transitory or non-transitory manner. Instructions 106 may be executed by processors 104 to cause system 100 to perform any of the functionality described herein. Instructions 106 may be implemented by any suitable application, software, script, code, and/or other executable data instance. Additionally, memory facilities 102 may also maintain any other data accessed, managed, used, and/or transmitted by processors 104 in a particular implementation.

Processors 104 may be implemented by one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using one or more processors 104 (e.g., when the processors are directed to perform operations represented by instructions 106 stored in one or more memory facilities 102), system 100 may perform functions associated with livestreaming audience-influenced content in accordance with methods and systems described herein and/or as may serve a particular implementation.

Figure 2:
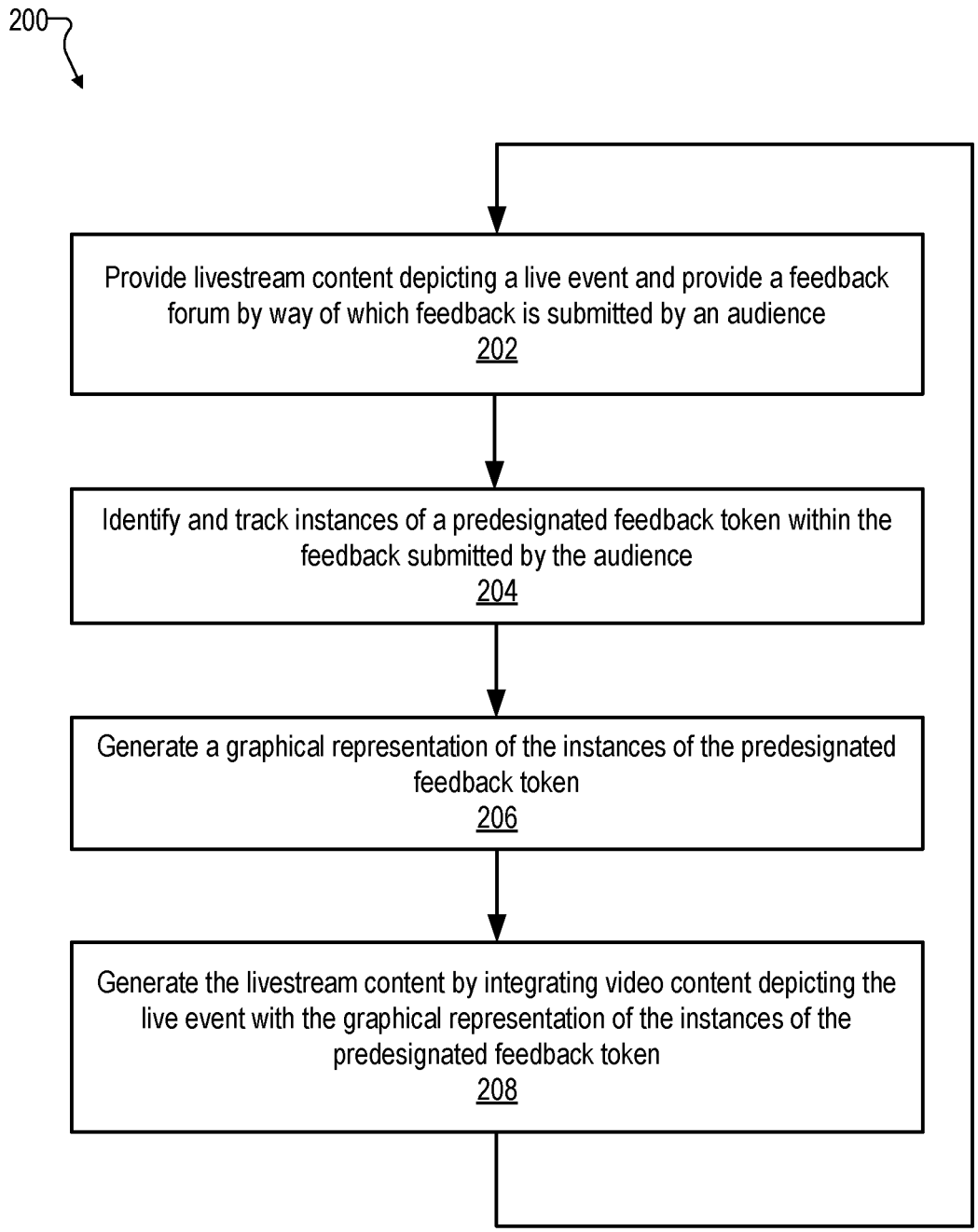
FIG. 2 shows an illustrative method for livestreaming audience-influenced content in accordance with principles described herein.

As one example of functionality that processors 104 may perform, FIG. 2 shows an illustrative method 200 for livestreaming audience-influenced content in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel)

with one another, rather than being performed sequentially as illustrated and/or described. Additionally, as illustrated, it will be understood that, during operation, system 100 may perform method 200 as a continuous process (e.g., in a loop and where each of the operations is being performed continuously in parallel) rather than performing the method merely once. One or more of the operations shown in FIG. 2 may be performed by an audience-influenced livestreaming system such as system 100 and/or any implementation thereof.

Due to the nature of livestream content being generated and provided, operations of method 200 may be performed in real time so as to provide, receive, process, and/or use data described herein immediately as the data is generated, updated, changed, exchanged, or otherwise becomes available (e.g., analyzing audience feedback, generating and compositing graphics to create the livestream content, etc., even as the live event depicted in the livestream content is ongoing). Operations described herein may therefore involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by an implementation of system 100 (e.g., by processors 104 executing instructions 106 stored in memory facilities 102).

At operation 202, system 100 may provide livestream content to an audience. The livestream content may depict a live event (e.g., a performance, a presentation, a live sporting event, etc.) and may include video content, audio content, extended reality content (e.g., virtual augmentations to the audio/video content, etc.), and/or other suitable types of content as may serve a particular implementation. The livestream content may be provided by system 100 using any suitable communications technologies or media. For example, the livestream content may be multicast or broadcast over a carrier network (e.g., to subscribers of a service associated with the carrier network), over a local or wide-area network, over the Internet, over the air, or over any other suitable medium of communication.

As part of providing the livestream content at operation 202, system 100 may also provide a feedback forum associated with the livestream content. The feedback forum may be configured, for instance, such that feedback may be submitted (by the audience and during the live event) by way of the feedback forum. As one example, the feedback forum may be implemented as a chat feature that allows audience members to post textual, graphical, and/or other multimedia feedback (e.g., graphical tokens such as emotes, emoji, etc.; audio or video clips; etc.) in a common repository viewable by other audience members. In some implementations, the feedback forum may be presented together with the livestream content (e.g., in an adjacent pane of the same user interface, etc.). For example, a livestream service such as Twitch may provide a chat box immediately adjacent to a view of the livestream content that is being distributed. In other examples, a feedback forum may be hosted by a separate service than the one transmitting the livestream content (i.e., system 100), but may be considered to be provided by system 100 if the feedback forum is indicated or well-understood to be associated with the livestream content being transmitted. As one example, a feedback forum for livestream content could be implemented by a particular hashtag that viewers are instructed to use when posting feedback to third party services such as Twitter or Facebook. As another example, a discussion forum hosted by a third party could be well-known to be associated with the livestream content (e.g., a Reddit forum in which viewers of a weekly show are known to discuss it live as it airs, etc.).

At operation 204, system 100 may identify and track instances of a predesignated feedback token that are found within the feedback submitted by the audience in the feedback forum provided at operation 202. For example, as will be described in more detail below, the predesignated feedback token may be a textual statement (e.g., "Let's Go!") or a graphical token (e.g., a "thumbs-up" emoji, a particular emote, etc.) that audience members are invited to post as an interaction to the livestream content being provided at operation 202 (e.g., to show their approval/excitement if they are enjoying the livestream content, to select or vote for a particular option presented in the livestream content, etc.). More particularly, at operation 204, system 100 may analyze incoming feedback within the feedback forum to search for exact or near matches to one or more predesignated feedback tokens that the audience has been invited to submit, and may identify these tokens when they occur. Once identified, system 100 may also track the instances of each predesignated feedback token by, for example, maintaining a count of some or all of the instances that have been identified. As will be described, in some examples, the tracking may be performed in accordance with certain rules. As one example rule, for instance, if an audience is known to have a tendency to post a string of instances of a particular predesignated feedback token (e.g., messages with 5-10 "thumbs-up" emojis in a row if that is the requested predesignated feedback token and the audience is enthusiastic about the presentation), the tracking may operate to count only one instance of the predesignated feedback token per feedback message, rather than counting all 5-10 of them separately. Another example rule may involve a limited time period (e.g., indicated using a count-down timer displayed within the livestream content, associated with the run time of a song or other performance presented in the livestream content, etc.) during which the instances of the predesignated feedback token are to be posted before the audience "runs out" of time. Various other rules may likewise be employed as may serve a particular implementation.

At operation 206, system 100 may generate a graphical representation of the instances of the predesignated feedback token that are identified and/or tracked at operation 204. For example, each time that a predesignated feedback token is identified and tracked within a submitted feedback message from an audience member, system 100 may convert the detected predesignated feedback token into a graphical symbol (e.g., a "thumbs-up" symbol similar to the emoji or emote that the audience member submitted one or more of in their feedback message) that can be integrated into the livestream content so as to allow the entire audience to view the token. Additionally or alternatively, operation 206 may involve generating a graphical representation indicative of the instances of the predesignated feedback token by showing the current count (i.e., the total running number) of instances of the predesignated feedback token that has thus far been tracked. As will be described and illustrated in more detail below, for example, a phase of the live event may be associated with a goal of the audience submitting at least 50 predesignated feedback token instances and system 100 may generate a graphical indication of how many of those 50 have been identified and tracked so far.

At operation 208, system 100 may generate the livestream content that is provided at operation 202 (as indicated by the looping arrow that returns back to operation 202). The livestream content may be continuously generated at operation 208 based on processing performed at operations 204 and 206, and may then be continuously provided at operation 202 for as long as the live event continues. The generating of the livestream content at operation 208 may include integrating video content depicting the live event with the graphical representation (generated at operation 206) of the instances of the predesignated feedback token. The video content may be captured by video cameras present at the live event and the graphical representation of operation 206 may be integrated therewith in any suitable way. As one example, the graphical representation of the instances of the predesignated feedback token may be injected into the video content by presenting the graphical representation on a graphical display that is present at the scene and being captured in the video stream (e.g., a large LED wall behind the performers being depicted in the video content, an LED stage on which the performers are performing, etc.). As another example, the graphical representation of the instances of the predesignated feedback token may be overlayed onto the video content as a virtual augmentation (e.g., an instance of extended reality, etc.).

Figure 3:
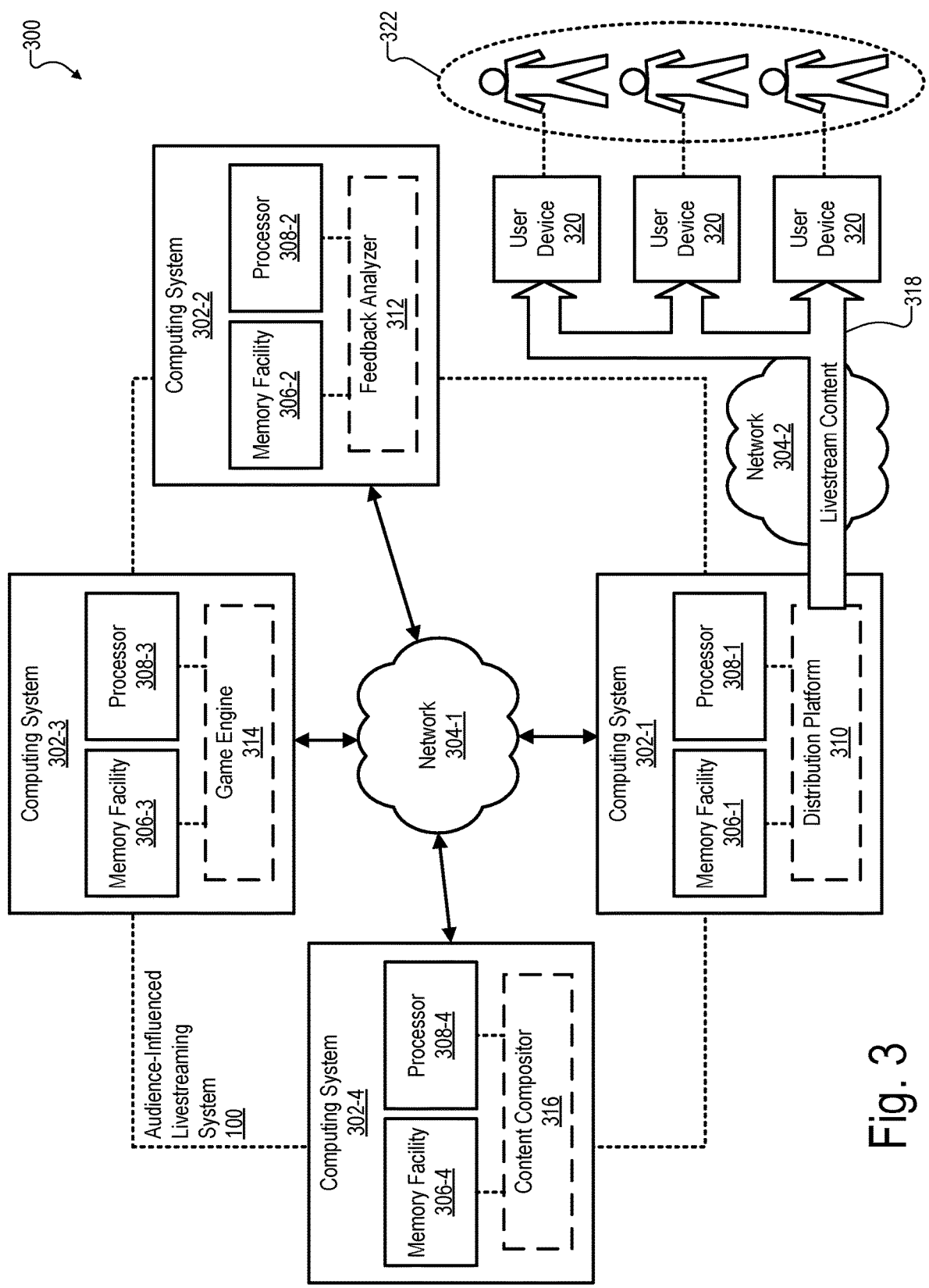
FIG. 3 shows an illustrative configuration in which a particular implementation of an audience-influenced livestreaming system may operate to livestream audience-influenced content in accordance with principles described herein.

FIG. 3 shows an illustrative configuration 300 in which a particular implementation of audience-influenced livestreaming system 100 may operate to livestream audience-influenced content in accordance with principles described herein. Specifically, the implementation of system 100 in configuration 300 is shown to include several computing systems 302 (computing systems 302-1 through 302-4) that overlap in the drawing with a dotted box labeled as audience-influenced livestreaming system 100. The computing systems 302 implementing system 100 in configuration 300 are also shown to be communicatively coupled to one another by way of a network 304-1. Each computing system 302 in FIG. 3 is shown to include a respective memory facility 306 and a respective processor 308 (i.e., memory facility 306-1 and processor 308-1 for computing system 302-1, memory facility 306-2 and processor 308-2 for computing system 302-2, memory facility 306-3 and processor 308-3 for computing system 302-3, and memory facility 306-4 and processor 308-4 for computing system 302-4). These respective memory facilities and processors are shown to implement various components of the audience-influenced livestreaming system, including a distribution platform 310 (implemented by memory facility 306-1 and processor 308-1), a feedback analyzer 312 (implemented by memory facility 306-2 and processor 308-2), a game engine 314 (implemented by memory facility 306-3 and processor 308-3), and a content compositor 316 (implemented by memory facility 306-4 and processor 308-4).

In this example implementation of system 100, memory facility 306-1 represents one of memory facilities 102 and processor 308-1 represents one of processors 104, such that computing system 302-1 is configured as distribution platform 310 to perform the providing of the livestream content and the feedback forum described above in relation to operation 202 of method 200. Memory facility 306-2 then represents another of memory facilities 102 and processor 308-2 represents another of processors 104, such that computing system 302-2 is configured as feedback analyzer 312 that performs the identifying of the instances of the predesignated feedback token described above in relation to operation 204 of method 200. Memory facility 306-3 represents yet another of memory facilities 102 and processor 308-3 represents yet another of processors 104, such that computing system 302-3 is configured as game engine 314 that performs the tracking of the instances of the predesignated feedback token described in relation to operation 204 and/or the generating of the graphical representation of the instances of the predesignated feedback token described in relation to operation 206. Memory facility 306-4 represents yet another of memory facilities 102 and processor 308-4 represents yet another of processors 104, such that computing system 302-4 is configured as a content compositor that performs the generating of the livestream content described above in relation to operation 208. As will be described in more detail below, content compositor 316 may provide the livestream content to distribution platform 310 implemented by the first computing system to allow distribution platform 310, in turn, to provide livestream content 318 to a plurality of user devices 320 associated with an audience 322 of viewers (i.e., audience members) by way of a network 304-2.

Distribution platform 310 may perform the distribution of livestream content 318 and provide the audience feedback forum in any of the ways described herein and may be implemented as any type of distribution platform as may serve a particular implementation. As one example, distribution platform 310 may use Twitch or other similar services to accomplish both the video distribution and to serve as an audience feedback tool.

Feedback analyzer 312 may analyze audience feedback that is received by the distribution platform 310 in any of the ways described herein and may be implemented as any type of feedback analyzer as may serve a particular implementation. As one example, feedback analyzer 312 may be implemented on a MEC server (e.g., an AWS Wavelength server, a 5G MEC server, etc.) and use appropriate APIs to implement a chat scraper configured to analyze the audience feedback (e.g., emote text provided by distribution platform 310) and identify the instances of the predesignated feedback tokens. As each token (or particularly-sized batches of tokens) are identified, feedback analyzer 312 may generate messages (e.g., Open Sound Control (OSC) commands, UDP or TCP packets, MIDI data, DMX data, etc.) that may be provided to game engine 314 (e.g., using OSC, UDP, or another suitable protocol) to indicate the detection of the tokens.

Game engine 314 may track the identified instances of the predesignated feedback token, generate graphical representations of the detected instances of the predesignated feedback token, and/or otherwise support gamification aspects of the application in any of the ways described herein. Game engine 314 may be implemented as any type of game engine as may serve a particular implementation. As one example, game engine 314 may be implemented by an Unreal Engine or other similar game engine and/or display controller that can maintain the token instance count, manage level calculations (e.g., for implementations that support progression through a series of levels as will be described in more detail below), and display content based on the current token instance count and level.

Content compositor 316 may generate livestream content 318 by integrating (e.g., live compositing, etc.) video content depicting the live event (e.g., provided by a video capture system not explicitly shown in configuration 300) with one or more graphical representations generated by one or more game engines 314 (e.g., graphical representations of the instances of the predesignated feedback token, other graphical representations associated with the live event generated by additional game engines 314 not explicitly shown in configuration 300, etc.). Content compositor 316 may integrate different types of content (e.g., video content, augmentations, etc.) in any of the ways described herein and may be implemented as any type of content compositor as may serve a particular implementation. As one example, content compositor 316 may be implemented by a Disguise Live Compositing engine that injects graphical representations provided by the game engine into the video stream in various ways described herein.

Networks 304-1 and 304-2 may represent a single network 304 that supports all the communications described above or, in other implementations, these may represent two separate and distinct networks (e.g., of distinct types and/or with distinct features). The characteristics of networks 304 may enable or provide support for certain benefits of the audience-influenced livestream content described herein. For example, the ultra-low latency described above that allows audience feedback to be communicated practically instantaneously (e.g., from audience 322 to performers or others participating in the live event) may be facilitated by 5G technologies, MEC technologies, ultra-wideband technologies, and so forth, that are implemented within networks 304-1 and/or 304-2.

Figure 4:
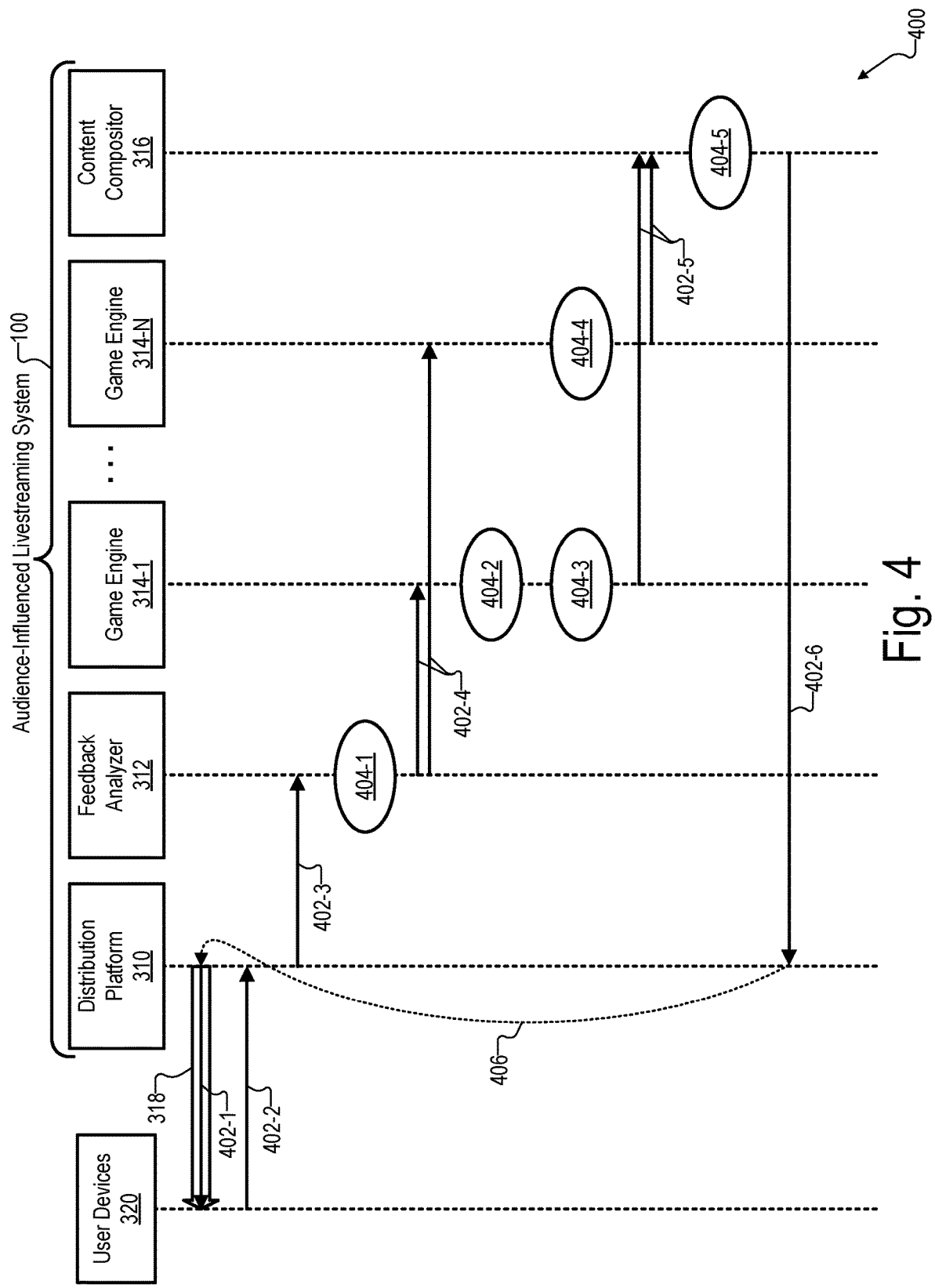
FIG. 4 shows an illustrative data flow by way of which the audience-influenced livestreaming system of FIG. 3 may livestream the audience-influenced content in accordance with principles described herein.

FIG. 4 shows an illustrative data flow 400 by way of which the implementation of system 100 described in relation to FIG. 3 may livestream audience-influenced content in accordance with principles described herein. As shown by the bracket around components 310-316, the implementation of system 100 for this example data flow will be understood to include computing systems (e.g., computing systems 302 described above in relation to FIG. 3) that implement a distribution platform 310, a feedback analyzer 312, one or more game engines 314 (e.g., game engines 314-1 through 314-N in this example), and a content compositor 316. While each of these components of system 100 may perform any of the operations that have been described, data flow 400 shows certain communications 402 that may be produced by system 100 (e.g., communications 402-1 through 402-6, illustrated by arrows between specific components of system 100 and/or user devices 320) and certain operations 404 that may be performed by these components of system 100 (operations 404-1 through 404-5, illustrated by ovals associated with particular components of system 100). Communications 402 and operations 404 of example data flow 400 will now be described in more detail with reference to FIG. 4, as well as with reference to FIGS. 5-7.

At communication 402-1, distribution platform 310 provides livestream content 318 to user devices 320 as described above. For example, as will be described and illustrated in more detail below, the livestream content provided in this communication may include an integration of video content depicting a live event, one or more graphical presentations created based on received audience feedback, and so forth.

As has been described, livestream content 318 may depict any type of live event. For instance, certain live events may take place as a single, monolithic entity, while other live events may be divided into a plurality of distinct segments. For the following example illustrated by data flow 400, a segment of a live event will be described and illustrated that will be understood to be included in a plurality of distinct segments into which the live event is divided. In this example, the plurality of distinct segments will be understood to be associated with a progression of levels that the audience traverses by submitting, within each distinct segment, a sufficient count of instances (e.g., 1 instance, 50 instances, 1000 instances, etc.) of a certain predesignated feedback token to reach a threshold value set for the current segment.

Figure 5:
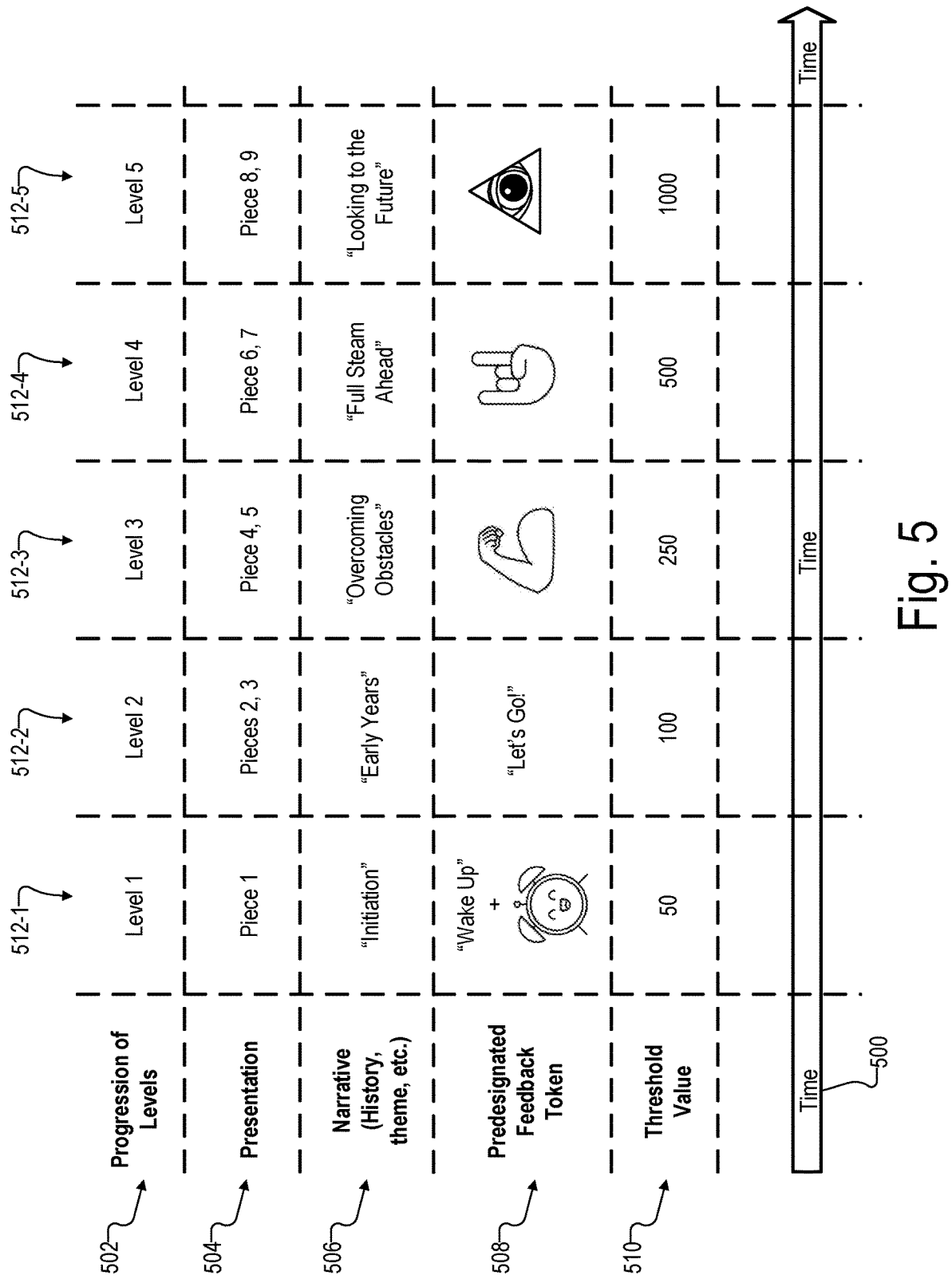
FIG. 5 shows illustrative aspects of a gamified live event that includes a plurality of distinct segments configured to progress, over time, through a plurality of levels in accordance with principles described herein.

To illustrate, FIG. 5 shows certain aspects of a gamified live event that includes a plurality of distinct segments configured to progress, over time, through a plurality of levels in accordance with principles described herein. More particularly, as shown, various aspects of the gamified live event of this example are illustrated along a timeline 500, including an aspect 502 relating to the progression of levels in the different segments, an aspect 504 relating to what is being presented ("Presentation") at each segment, an aspect 506 relating to a narrative that is carried along through the various segments, an aspect 508 relating to active predesignated feedback tokens for each segment, and an aspect 510 relating to active threshold values for each segment. Each of these aspects 502-510 is shown at five distinct times 512 (i.e., times 512-1 to 512-5) along timeline 500 that will be understood to represent five distinct segments of this particular live event.

While various types of live events may benefit from principles described herein, a specific type of gamified live event is illustrated in FIG. 5. Specifically, the gamified live event of this example is shown to be a musical presentation (e.g., a pop concert, etc.) featuring performance of a set of musical pieces (e.g., pop songs, etc.) by an artist (e.g., a singer accompanied by a band, etc.). In this type of live event, one or more musical pieces of the set of musical pieces may be performed in each of the plurality of distinct segments, and the progression of levels may correspond to a narrative associated with a history of the artist, a theme of the musical presentation, or the like ("History, theme, etc.").

More specifically, as shown at time 512-1, Level 1 (along aspect 502) is shown to be associated with Piece 1 (along aspect 504), which may be one of the first songs the artist ever wrote or released and helps represent the "Initiation" part of the narrative (along aspect 506). At time 512-2, Level 2 is shown to be associated with Pieces 2 and 3, which may be songs from early in the artist's career that help represent the "Early Years" part of the narrative. At time 512-3, Level 3 is shown to be associated with Pieces 4 and 5, which may be songs from a time when the artist was struggling to break into the industry and that help represent the "Overcoming Obstacles" part of the narrative. At time 512-4, Level 4 is shown to be associated with Pieces 6 and 7, which may be hits from later in the artist's career after they became well-established and began gaining notoriety in the industry to help represent the "Full Steam Ahead" part of the narrative. Finally, at time 512-5, Level 5 is shown to be associated with Pieces 8 and 9, which may be some of the most recent hits that have been released and that show the current direction of the artist to help represent the "Looking to the Future" part of the narrative.

As mentioned above, this segmented, music-presentation-based live event is provided only by way of example, and it will be understood that various other non-segmented and/or non-music-presentation events (e.g., sporting events, reality shows, promotional events, news events, and/or any other live events in which feedback from an audience may be useful in guiding or influencing the event in some way) may benefit from the same principles described here. Moreover, even for concert events like the one described in relation to FIG. 5, it will be understood that the particular number of levels, distribution of musical pieces, narrative structure, and other aspects shown in FIG. 5 are provided only as a non-limiting example of how segments and levels could be broken out for one particular type of live event. In certain examples, more or fewer aspects of the presentation could be mapped out in this way. For instance, while not shown in FIG. 5, a time period associated with each level could be designated to define how long the audience will be given to post instances of the current predesignated feedback token before the round is considered complete (at which point the audience will have either achieved or failed to achieve the target threshold, etc.).

Returning to FIG. 4, the audience viewing livestream content 318 using user devices 320 (i.e., audience 322, not explicitly shown in FIG. 4) may direct user devices 320 to submit communication 402-2 to distribution platform 310. For example, as has been described, communication 402-2 may represent various types of audience feedback (e.g., textual chat messages, graphical emotes/emojis, audio and/or video feedback, etc.) provided within a feedback forum provided by system 100 (e.g., by distribution platform 310) in the ways described herein. In some examples, the audience feedback provided by way of communication 402-2 may include one or more predesignated feedback tokens that may be identified, tracked, and ultimately used to influence the livestream content that the audience is viewing. Such predesignated feedback tokens may include graphical elements (e.g., a particular emote, a particular emoji, etc.), textual elements (e.g., a particular word or phrase, etc.), a combination of one or more graphical and textual elements, and/or any other predesignated feedback token as may serve a particular implementation (e.g., based on graphics, text, audio, video, or other types of data).

To illustrate, different predesignated feedback tokens are shown to be associated with each of the segments (i.e., Level 1 through Level 5) in the example of FIG. 5. Specially, as shown within aspect 508 at time 512-1, the predesignated feedback token associated with the first segment (i.e., Level 1) may be a combination of a textual phrase, "Wake Up," and a graphical emote with an appearance of an alarm clock. Accordingly, for this segment, each instance of submitted audience feedback that includes this combination ("Wake Up"+the alarm clock emote) may thus be identified and tracked until the current count of instances is sufficient to reach the respective threshold value (i.e., 50 for this segment, as shown at time 512-1 along aspect 510). As shown at time 512-2, the predesignated feedback token associated with the second segment (i.e., Level 2) may be implemented as a textual phrase: "Let's Go!". Accordingly, for this segment, each instance of submitted audience feedback that includes this phrase may thus be identified and tracked until the current count of instances is sufficient to reach the respective threshold value (i.e., 100 for this segment). As shown at time 512-3, the predesignated feedback token associated with the third segment (i.e., Level 3) may be a particular emote that shows an arm flexing its bicep. Accordingly, for this segment, each instance of submitted audience feedback that includes this arm flex emote may thus be identified and tracked until the current count of instances is sufficient to reach the respective threshold value (i.e., 250 for this segment). As shown at time 512-4, the predesignated feedback token associated with the fourth segment (i.e., Level 4) may be a particular emote that shows a hand gesture. Accordingly, for this segment, each instance of submitted audience feedback that includes this hand gesture emote may thus be identified and tracked until the current count of instances is sufficient to reach the respective threshold value (i.e., 500 for this segment). Finally, as shown at time 512-5, the predesignated feedback token associated with the fifth segment (i.e., Level 5) may be a particular emote that shows an emote with an eye inscribed on a pyramid. Accordingly, for this segment, each instance of submitted audience feedback that includes this eye emote may thus be identified and tracked until the current count of instances is sufficient to reach the respective threshold value (i.e., 1000 for this segment).

The live event may hence be gamified by way of these predesignated feedback tokens and the respective threshold values for each segment of the event. For example, the audience may traverse the progression of levels (e.g., moving from Level 1 to Level 2, then from Level 2 to Level 3, etc.) by submitting, within each distinct segment, a sufficient count of instances of the respective predesignated feedback token to reach the respective threshold value for that segment. In other examples, the event may be configured to proceed from level to level regardless of audience feedback, though meeting the respective threshold values in each segment may have other effects (e.g., changing an aesthetic aspect of the presentation such as adding strobing lights and confetti to create a "party mode," or the like).

While predesignated feedback tokens may be determined and set prior to commencement of the live event in some cases (e.g., selected by the artist or a producer of the live event during a planning or setup phase for the event), predesignated feedback tokens (e.g., emotes, emojis, textual phrases, etc.) may, in other cases, be added, removed, or modified during the live event (e.g., during a segment, immediately prior to a segment, etc.). Additionally, threshold values may also be determined dynamically during the live event in certain implementations (e.g., after the event has begun and prior to, or during, a respective segment to which the threshold value applies). For example, while a producer of the live event may be well-positioned to create the set list (i.e., Pieces 1-9), to associate each musical piece with its respective part of the narrative, and to select an appropriate predesignated feedback token that relates to that level in some way, it may be more difficult for the producer to determine how large and/or engaged an audience will be prior to the commencement of the live event. Accordingly, while the threshold for each segment may in some cases be predesignated before the event begins, it may also be dynamically designated during the performance (e.g., prior to or even during the segment to which the threshold will apply). For instance, if the threshold value of 50 is not quite reached during Level 1, the threshold value of 100 may be determined to be too great for Level 2 and it may be dynamically readjusted (e.g., prior to commencement of the second segment associated with Level 2) to 60. Conversely, if the threshold value of 50 is easily met during the first minute of Level 1 (and ultimately far surpassed to reach, say, 150 instances), the threshold value of 100 may be determined to be too small for Level 2 and it may be dynamically readjusted to 200.

Returning to FIG. 4, distribution platform 310 may convert the audience feedback from communication 402-2 into a form that facilitates the feedback being analyzed and may provide that data to feedback analyzer 312 as communication 402-3. For example, if feedback analyzer 312 is configured to scrape the chat based on a textual analysis, distribution platform 310 may convert any non-textual data (e.g., emotes, emojis, audio or video tokens, etc.) into a textual form that will be understood by feedback analyzer 312 to facilitate the identification of predesignated feedback tokens by feedback analyzer 312. Distribution platform 310 may then provide this textual data to feedback analyzer 312 in real time (e.g., over 5G to a feedback analyzer 312 implemented by a MEC server so as to create a minimal delay in the audience feedback being received and being analyzed).

At operation 404-1, feedback analyzer 312 may identify, within the audience feedback received in communication 402-3, instances of a predesignated feedback token (e.g., whichever predesignated feedback token is currently active, based on the present segment or level of the live event, if applicable). To accomplish this, feedback analyzer 312 may perform any string parsing, chat scraping, text searching, and/or other analysis as may serve a particular implementation. In some examples, feedback analyzer 312 may employ regular expressions or other such search tools to efficiently analyze the audience feedback and identify known tokens that are relevant at the particular time. While some implementations may call for feedback analyzer 312 to identify only exact matches as instances of the predesignated feedback token, other implementations may consider close (non-exact) matches to also be instances of the predesignated feedback token. For instance, regular expressions could be used to identify a predesignated feedback token such as "Let's Go!" (the predesignated feedback token for Level 2 in FIG. 5) whenever any of the following strings is found in the audience feedback: "let's go", "Let's go", "Let's Go", "let's go!" "lets go", and so forth.

It may be a tendency of many audience members posting feedback within a feedback forum to include multiple tokens (e.g., repeating emotes, etc.) in each audience feedback unit (e.g., each chat message, etc.). For example, if a predesignated feedback token is represented by the symbol 'X', certain audience members may express enthusiasm by submitting messages such as "Yes! X X X X X X". In certain implementations, it may not be desirable to count each of these instances X of the predesignated feedback token against the threshold value that is being targeted. Accordingly, in some examples, system 100 may be configured to consolidate multiple instances of a predesignated feedback token within a single unit of audience feedback (e.g., a single chat message, etc.) so that the multiple instances are only counted as one instance. This consolidation may be performed either by feedback analyzer 312 (e.g., analyzing each message and only identifying and/or reporting one instance per message), by game engine 314 (e.g., receiving all the instances of the predesignated feedback token that can be identified and consolidating them if there is more than one instance per message), by a combination of the two, or in other suitable ways.

As one example of how a multiple-token audience feedback unit may be handled, system 100 may track the instances of the predesignated feedback token by maintaining a current count of instances of the predesignated feedback token submitted by the audience such that the current count is incremented just once for each audience feedback unit (e.g., once per message, chat, post, submission, etc.) in which one or more instances of the predesignated feedback token (up to an unlimited number of instances) are identified. As another example, system 100 may track the instances of the predesignated feedback token by maintaining a current count of instances of the predesignated feedback token submitted by the audience such that the current count is incremented for every instance of the predesignated feedback token that is identified but where no more than one instance is identified per audience feedback unit (e.g., analysis stops for a message after one instance is found). In other implementations, multiple-token messages may be handled in still other ways. For instance, system 100 could count every instance of the predesignated feedback token that can be identified (regardless of how many there are); system 100 could count one instance for every message that includes between 1 and an upper threshold number of instances (e.g., between 1-10 instances); system 100 could count 1 instance for every N number of instances that can be identified in a single message (e.g., 1 out of every 5, such that a message with 1 instance would count 1 and a message with 17 instances would count 4, etc.); or system 100 could employ some other suitable counting methodology as may serve a particular implementation.

To receive communication 402-2 and perform the feedback analysis, feedback analyzer 312 may reference the feedback forum via a unique URL (e.g., using particular account credentials or accessing it in another manner). Feedback analyzer 312 may then search for exact or near matches within the audience feedback in any of the ways described herein.

Communications 402-4 may be provided by feedback analyzer 312 to each of one or more game engines 314 (e.g., N game engines, as shown in the example of FIG. 4). For instance, as mentioned above, this communication may be performed using OSC messages over 5G to ensure that minimal latency or delay is introduced into the overall data flow (e.g., so that the performers will be apprised of audience feedback immediately as it is given and so that the audience may also participate in the gamified event in a real-time, near-instantaneous manner). In other examples, other protocols may be used instead of OSC as may serve a particular implementation. For instance, UDP, TCP, MIDI, DMX, or another suitable communication protocol may be employed.

In some implementations, communication 402-4 may include different respective messages corresponding to each instance of the predesignated feedback token and/or each distinct audience feedback unit. For instance, as described above, feedback analyzer 312 may be configured to perform instance consolidation operations and provide a different message for each instance of the predesignated feedback token that is to be tracked and counted. In other implementations, as also mentioned above, feedback analyzer 312 could be configured to send a message associated with each audience feedback unit that is received, and to report, within that message, each instance of the predesignated feedback token that was identified within the audience feedback unit (i.e., such that the consolidation operation can be performed by the game engine 314). In still other implementations, feedback analyzer 312 may assist with the tallying of the instance count and, for example, send distinct messages to the game engine for every N instances that are identified to be countable (e.g., every 10 instances or the like).

At operation 404-2, game engine 314-1 may track the identified and/or countable instances of the relevant predesignated feedback token for a particular segment of the live event. Additionally, as part of performing this tracking (e.g., maintaining the current count), game engine 314-1 may further be configured to compare (e.g., in real time during a particular segment of the live event) a threshold value (e.g., the particular threshold value associated with the particular segment) to the current count of instances of the predesignated feedback token that have been identified and tracked (e.g., since the segment commenced).

Figure 6:
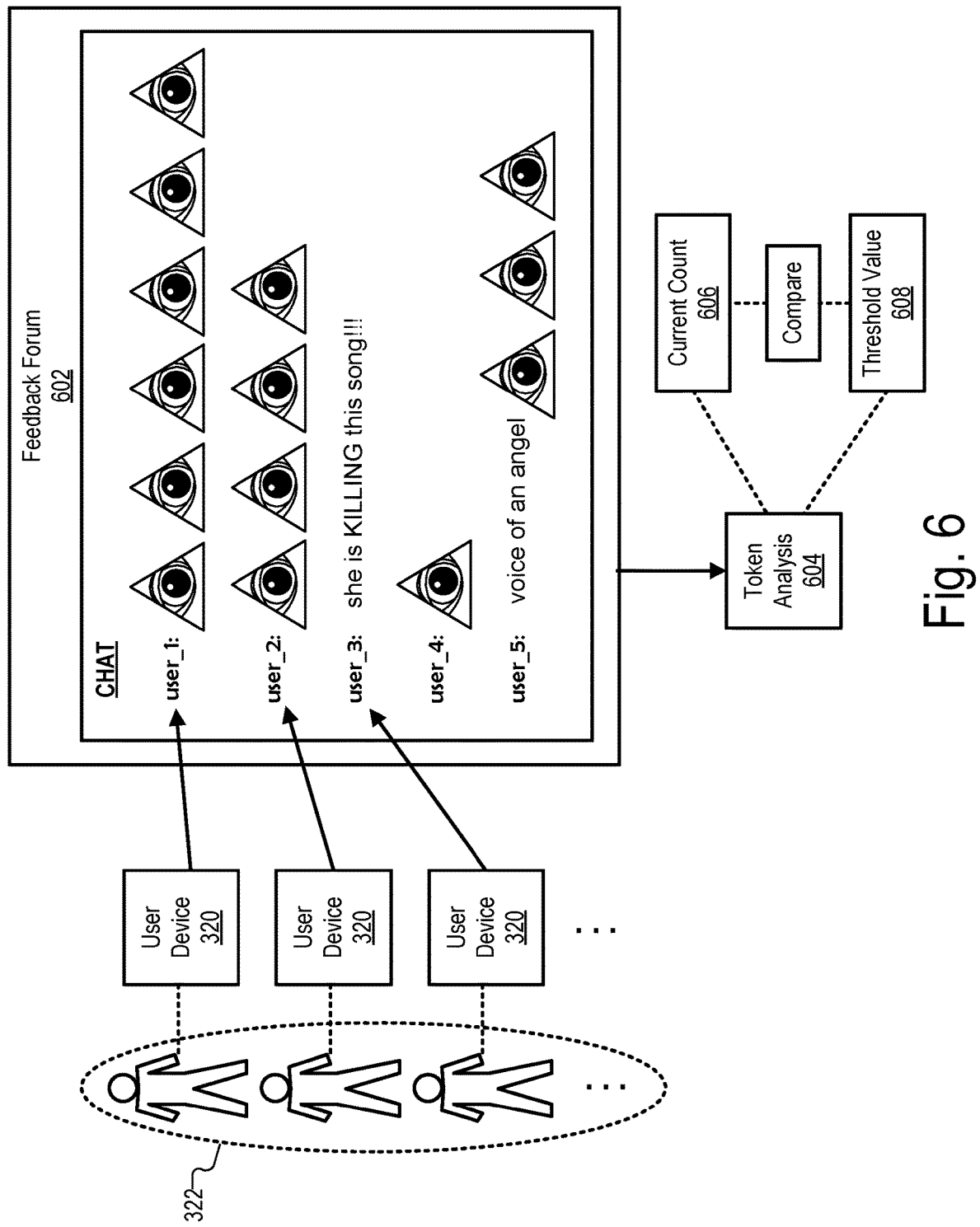
FIG. 6 shows an illustrative feedback forum provided during a live event to allow an audience to submit feedback about livestream content in accordance with principles described herein.

To illustrate, FIG. 6 shows an illustrative feedback forum 602 that system 100 (e.g., distribution platform 310) may provide during a live event to allow audience 322 to submit feedback about livestream content using their respective user devices 320 in accordance with principles described herein. Based on audience feedback provided in this way, FIG. 6 further shows a token analysis 604 (which may be performed by game engine 314-1 as part of operation 404-2, for example) that results in a current count 606 that is compared to a threshold value 608 (as indicated by a box labeled "Compare" between current count 606 and threshold value 608).

As shown, audience members of audience 322 may use their respective user devices 320 to submit or post messages (i.e., audience feedback units) within feedback forum 602, which is shown to be implemented as a chat forum in this implementation. For example, a first audience member ("user_1") has submitted a message with six instances of an eye emote (which will be understood to represent the active predesignated feedback token currently targeted for the segment represented at this moment in time as shown in the fifth segment of the example described in relation to FIG. 5). Another audience member ("user_2") is then shown to have posted a message with four instances of the current predesignated feedback token, and another ("user_3") has posted a textual message ("she is KILLING this song !!!"). Two other audience members who are not explicitly shown with their respective user devices 320 in FIG. 6 are also shown to have submitted messages to feedback forum 602—one audience member ("user_4") has posted one instance of the eye emote predesignated feedback token and another audience member ("user_5") has posted a combination of text ("voice of an angel") and three instances of the predesignated feedback token.

Token analysis 604 may be performed to analyze these various messages from illustrative feedback forum 602 and to update current count 606 in any of the ways described herein. For instance, token analysis 604 could be configured in one implementation to increment current count 606 for each instance of the specific predesignated feedback token (i.e., eye emotes in this example) that can be identified (e.g., six from user_1, four from user_2, one from user_4, and three from user_5, for a total count of 14). Alternatively, token analysis 604 could be configured in another implementation to increment current count 606 only once for each message that includes at least one instance of the predesignated feedback token (or between one and an upper bound instances) that is identified (e.g., one from each of user_1, user_2, user_4, and user_5, for a total count of 4). In still other implementations, token analysis 604 may be configured in other ways to increment current count 606 in accordance with other policies described herein or as may serve a particular implementation.

In any of these cases, token analysis 604 may not only maintain current count 606 but may also compare the count to threshold value 608 so that certain actions may be performed when the count reaches the desired threshold. For example, as has been described, a gamified live event may be arranged such that movement from one segment or level to another is contingent on the current count of predesignated feedback token instances reaching the predesignated threshold value for the current segment. Alternatively, other examples may apply special effects to "celebrate" when the threshold is reached (e.g., presenting the livestream content in a "party mode" with brighter colors, flashing lights, special graphics, etc.) or may otherwise signify that the goal has been achieved or influence the livestream content based on the achievement.

In some implementations, the gamification of the live event may serve to create audience engagement by adding fun and interest to the interactive feedback process, while the integrity of the current count of instances of the predesignated feedback token may be of secondary concern as compared to moving the live event along according to plan. Accordingly, in such implementations, token analysis 604 may be configured to conspicuously or inconspicuously increment or decrement current count 606 in accordance with the goals of the live event and whatever the current circumstances may be as the event proceeds. For example, if system 100 or a producer overseeing the live event determines that there is more audience engagement than expected such that the threshold value may be reached earlier than desired, token analysis 604 may be used to reduce the instances are being counted by, for instance, artificially lowering the count by a certain amount, dynamically changing the policy being used to count instances (e.g., changing from counting all the instances to counting only one per message, etc.), or otherwise exerting some external control over current count 606. On the other hand, and as another example, if system 100 or a producer overseeing the live event determines that there is less audience engagement than desired such that the threshold value may not be reached and the live event will not be able to proceed as desired, token analysis 604 may similarly be used to increase the instances being counted by, for instance, artificially raising the count by a certain amount, dynamically changing the policy being used to count instances (e.g., changing from counting only one instance per message to counting all the instances that can be identified, etc.), or otherwise exerting the same types of external control over current count 606 described above. In other examples, the threshold value 608 may be conspicuously or inconspicuously altered on the fly (e.g., during a segment in which the audience is responding in an unexpected or undesirable way) to achieve similar objectives and help improve the live event in any manner as may be appropriate under the circumstances. For example, at a key moment, the threshold value 608 could be lowered (e.g., to zero or to the number of instances already collected) to ensure that the audience "wins" if that is always desirable for a certain use case. In these ways, the system may maximize audience engagement during most of the performance by creating an illusion of "risk" that the audience needs to post their tokens in the time period, but may still guarantee that the audience eventually prevails regardless of how many instances are actually detected.

Returning to FIG. 4, at operation 404-3, game engine 314-1 may be configured to generate a graphical representation of instances of the predesignated feedback token that have been identified and tracked (e.g., counted in current count 606). For example, for each tracked instance of the active predesignated feedback token (e.g., the predesignated feedback token that is requested from the audience during a particular segment, etc.), operation 404-3 may involve generating a graphical representation of that instance that can be integrated and shown with the livestream content, such as by appearing momentarily on the screen and then fading, by floating up or falling down from a virtual particle emitter placed at the live event, or by being presented to the viewing audience in other suitable ways as may serve a particular implementation.

Additionally, as further shown by data flow 400, one or more other game engines 314, including a game engine 314-N shown in FIG. 4, may similarly produce additional graphical representations that are also associated with the live event and configured to be integrated with the livestream content or otherwise presented to the audience. For example, as shown, game engine 314-N may perform an operation 404-4 in which an additional graphical representation is produced that may, for instance, combine current count 606 and threshold value 608 into a graphic that can be integrated with the livestream content (e.g., as an extended reality augmentation or the like) so as to indicate to the audience when the current count reaches the threshold value.

If the graphical representation produced at operation 404-3 shows the individual instances of the predesignated feedback token as they are identified and tracked, the additional graphical representation produced at operation 404-4 may include other related content as may serve a particular implementation. For instance, the additional graphical representation generated at operation 404-4 may include a graphical invitation to submit the particular predesignated feedback token (i.e., an indication of what the active predesignated feedback token is for a current segment of the live event), an indication of the current count of instances for the segment, an indication of the target threshold for the segment, an indication of how many instances are needed to reach the target threshold value (or how far past the threshold the current count has gone), and/or any other suitable information related to the live event and/or the gamification thereof.

In some implementations, each of the game engines 314 may operate on similar or identical data (e.g., the same instance of the game, the same communication 402-4, etc.), but may be responsible for different aspects of the ultimate presentation that is made. For instance, one game engine 314 (e.g., game engine 314-1) may be responsible for rendering imagery that is to be actually presented on a video display present in the event space where the live event is taking place (e.g., an LED wall, LED stage, projection screen, etc.) or that is at least made to appear to the audience as if it is presented on a video display in the event space (e.g., via green screen compositing, etc.). One or more other game engines 314 (e.g., game engine 314-N) may then be responsible for rendering imagery that is to be overlaid onto the livestream content 318 that is transmitted to the audience (e.g., extended reality imagery presented as an augmentation of the live event, etc.). In other examples, the workload may be divided up in other ways as may be desirable. Regardless of how the workload is divided up between the one or more game engines 314, content compositor 316 may serve as a hub for the various graphical representations that are produced to assemble (e.g., live composite) these graphics together into a single presentation.

To illustrate, communication 402-5 is shown to include data provided from each of the N game engines 314 to content compositor 316. The graphics data represented within communication 402-5 may be encoded using any suitable data format and may be transmitted using any of the networking technologies described herein to maintain the low latency and high reliability that has been described. Content compositor 316 may receive graphics data from each of the game engines 314 by way of communication 402-5 and, based on the graphics data, may proceed to perform operation 404-5 in which content compositor 316 may integrate video content with both: 1) the graphical representation of the instances of the predesignated feedback token, and 2) the additional graphical representation associated with the live event that are represented by communication 402-5. While the video content forming the basis of this integration is not explicitly shown in FIG. 4, it will be understood that the video content may be captured by one or more video capture devices, present at a scene of the live event, that may or may not be included within system 100.

Figure 7:
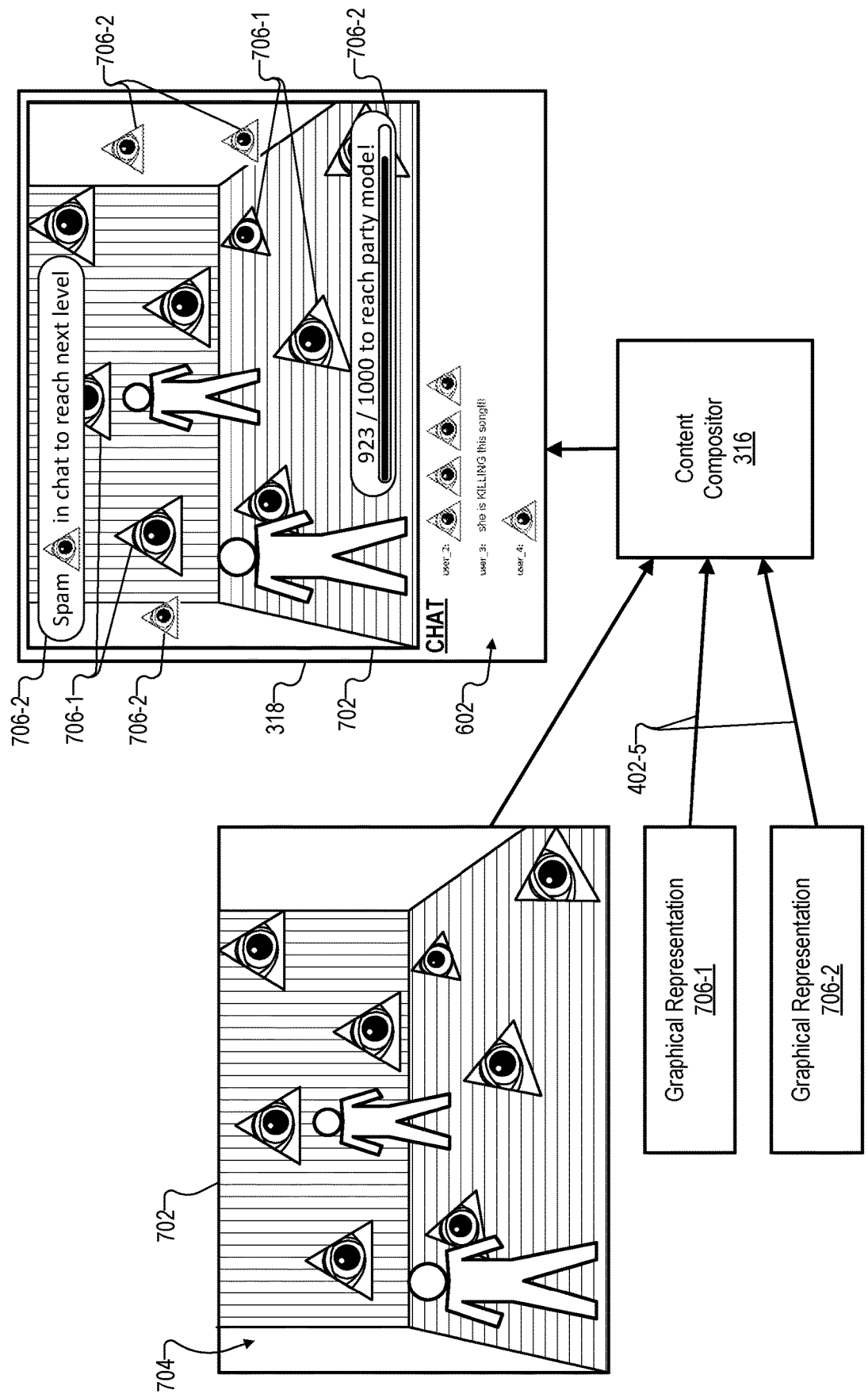
FIG. 7 shows illustrative aspects of how livestream content may be generated and provided to an audience in accordance with principles described herein.

To illustrate the operation 404-5 performed by content compositor 316, FIG. 7 shows illustrative aspects of how livestream content may be generated in accordance with principles described herein. As shown, FIG. 7 illustrates video content 702 that depicts a live event 704 in which subjects are performing on a stage. For instance, in this example, the figures depicted in video content 702 as being part of live event 704 may be musicians or other performing artists playing music or otherwise performing on an LED stage backed by an LED wall. This special stage and backing wall are drawn with a pattern of parallel lines that will be understood to represent an ability of the stage and wall to serve as large video displays that can present graphical content while the performers on stage go through their performance. In this example, for instance, the LED stage and back wall are shown to include graphical representations of the eye emote that have been submitted by the audience and identified and tracked by system 100. These graphics may move across the stage, float up or trickle down the wall, blink or fade, or otherwise be presented in any manner as may serve a particular implementation.

Along with video content 702 depicting live event 704, FIG. 7 further shows two graphical representations 706 (i.e., a graphical representation 706-1 and a graphical representation 706-2). Graphical representations 706 may be communicated from different respective game engines to content compositor 316 by way of communication 402-5, as described above. For example, graphical representation 706-1 may include graphics for the eye emote instances that have been detected and are to be displayed on the on-site video display (i.e., the LED stage or LED wall in this example), while graphical representation 706-2 may include additional graphics for information that is not to be displayed where the performers can see it, but rather is to be overlaid onto the livestream content to be seen by the audience. Accordingly, as illustrated by the livestream content 318 output from content compositor 316, the integrating of video content 702 depicting live event 704 with the graphical representations 706 associated with live event 704 may include overlaying one or more of these graphical representations 706 onto video content 702 as a virtual augmentation that is viewable by the audience receiving livestream content 318. Additionally or alternatively, as further illustrated in this particular example in which the live event occurs in an event space featuring one or more human subjects and a video display that is depicted together with the human subjects in the video content, the integrating of the video content 702 with graphical representations associated with live event 704 may include directing the video display (e.g., either or both of the LED stage and the LED wall in this example) to present one or more of these graphical representations 706. Moreover, another possibility illustrated by this example of FIG. 7 in which the live event occurs in the event space that features both the human subjects and the video displays is that the integrating of video content 702 with the graphical representations 706 by content compositor 316 may include both: 1) directing first graphical content to be presented by the video display in the event space (e.g., showing certain graphics on the LED stage and/or LED wall themselves, as shown), and 2) directing second graphical content different from the first graphical content to be overlayed onto the video content as a virtual augmentation (e.g., showing other graphics on the screen as an augmentation that would not be visible to the performers but only to the audience).

These various possibilities are all shown in the rendering of livestream content 318 depicted in FIG. 7 to be output from content compositor 316. Specifically, as shown, livestream content 318 includes a first pane for video content 702 and second pane for feedback forum 602 where the audience may submit messages as they view the live event presentation. As described above, video content 702 is shown to include various graphics associated with graphical representation 706-1 that are presented on the video displays (i.e., the LED stage and wall in this example) such that the graphics may be seen not only by an audience viewing the livestream content but also by the performers on the stage. Additionally, along with this video content 702, livestream content 318 shows that various graphics associated with graphical representation 706-2 are also overlaid onto the video content 702. These graphics are shown to include, as examples, an invitation to the audience to submit instances of a particular predesignated feedback token ("Spam [the eye emote] in chat to reach next level"); a progress indicator showing the current count, the target threshold value, and a graphical progress bar indicative of how close the goal is to being achieved ("923/1000 to reach party mode!"); and additional graphics showing instances of the predesignated feedback token that have been tracked but are only displayed as augmentations (rather than being shown on the video display at the event site like the graphics of graphical representation 706-1).

When sufficient instances of the active predesignated feedback token have been identified and tracked, content compositor 316 may reflect this fact in any suitable way within livestream content 318 being generated. As one example, content compositor 316 may be configured to apply a visual or audible effect to livestream content 318 beginning when the comparing indicates that the current count (i.e., 923 at the moment shown in FIG. 7) reaches the threshold value (i.e., 1000 in this example) and throughout a remainder of the segment of the live event. For instance, as the messages continue to come into feedback forum 602 with the active predesignated feedback token (the eye emote), the current count of 923 tracked instances may grow until reaching the target threshold of 1000, at which point visual effects (e.g., flashing lights, new graphics such as confetti streamers or fireworks or the like, bright colors, etc.) and/or audible effects (e.g., celebratory sounds such as airhorns, firework explosions, etc.) may be applied to signify the achievement. In this example, these effects may be incorporated in a presentation mode referred to as "party mode," as shown. In other examples, reaching the target threshold may influence whether the level advances, what the next segment will include (e.g., what song will be presented next), or the like.

While the graphics shown in the example of FIG. 7 are limited to textual information and predesignated feedback token graphics, it will be understood that any suitable textual, graphical, video, audio, or other information may be presented within audience-influenced livestream content such as livestream content 318. For example, video clips of individual audience members as they view the content could be displayed on the video wall or as augmentations on the screen, replays of key moments of the live event could be repeated in the background, and so forth. Additionally, in some examples, green screens may be employed rather than or in addition to video displays such as the LED stage and/or LED wall illustrated in the event space of live event 704 of FIG. 7. In such examples, the audience would still see an image similar to what is shown in FIG. 7, while the performers themselves would rely on a witness monitor (if available in the recording studio) to see the graphics of graphical representation 706-1 since these graphics would be added to the green screen virtually in a similar way as the overlaid graphics of graphical representation 706-2.

Returning to FIG. 4, data flow 400 shows that as content compositor 316 performs operation 404-5, it provides communication 402-6, which will be understood to include the composited video content with the graphics (i.e., the top pane of livestream content 318 shown in FIG. 7). An arrow 406 in FIG. 4 illustrates that this communication 402-6 may be received by distribution platform 310 and that this livestream content generated by content compositor 316 may be used to produce that livestream content 318 that is provided to user devices 320 to be viewed by the audience (e.g., after distribution platform 310 adds feedback forum 602 in the bottom pane and/or adds any other elements that are not already integrated by content compositor 316). As mentioned above with respect to method 200, data flow 400 will be similarly understood to be performed as a continuous process in which livestream content determines what the audience sees and hears so as to influence audience behavior (e.g., encouraging the audience to participate in the game by submitting instances of the predesignated feedback token, etc.) while feedback received from the audience simultaneously influences the livestream content being produced (e.g., since audience feedback is reflected in the graphics integrated into the presentation, etc.).

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 8:
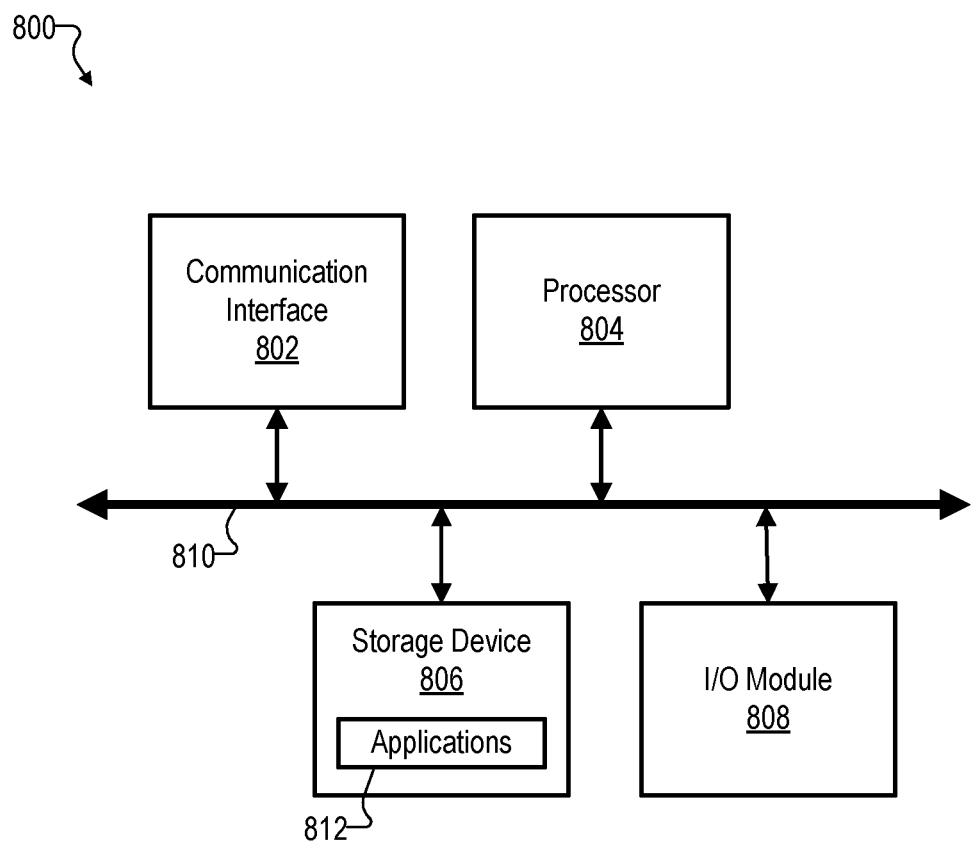
FIG. 8 shows an illustrative computing system that may implement audience-influenced livestreaming systems and/or other computing systems described herein.

FIG. 8 shows an illustrative computing system 800 that may implement part or all of audience-influenced livestreaming systems and/or other computing systems described herein. For example, computing system 800 may include or implement (or partially implement) audience-influenced livestreaming systems such as any implementations of system 100 described herein, any of computing systems 302 and/or the components that they implement (e.g., distribution platform 310, feedback analyzer 312, game engines 314, content compositor 316, etc.), devices used by audiences to participate with the audience-influenced livestream content (e.g., user devices 320), and/or any other computing devices or systems described herein (or any elements or subsystems thereof).

As shown in FIG. 8, computing system 800 may include a communication interface 802, a processor 804, a storage device 806, and an input/output (I/O) module 808 communicatively connected via a communication infrastructure 810. While an illustrative computing system 800 is shown in FIG. 8, the components illustrated in FIG. 8 are not intended to be limiting. Additional or alternative components may be used in other embodiments. Components of computing system 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 800. For example, one or more applications 812 residing within storage device 806 may be configured to direct processor 804 to perform one or more processes or functions associated with any of processors 104 of system 100. Likewise, any of memory facilities 102 of system 100 may be implemented by or within storage device 806.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
providing, to an audience, livestream content depicting a live event and a feedback forum associated with the livestream content and by way of which feedback is submitted by the audience during the live event;
identifying and tracking, within the feedback submitted by the audience, instances of a predesignated feedback token;
generating a graphical representation of the instances of the predesignated feedback token;
generating the livestream content by integrating video content depicting the live event with the graphical representation of the instances of the predesignated feedback token;
comparing, in real time during a segment of the live event that is included in a plurality of distinct segments into which the live event is divided, a threshold value to a current count of instances of the predesignated feedback token that have been identified and tracked since the segment commenced; and
based on the comparing, integrating the threshold value and the current count with the livestream content so as to indicate to the audience when the current count reaches the threshold value,
wherein:
the plurality of distinct segments is associated with a progression of levels that the audience traverses by submitting, within each distinct segment, a sufficient count of instances of a respective predesignated feedback token to reach different respective threshold values set for each of the plurality of distinct segments; and each of the different respective threshold values is set dynamically for its respective segment of the plurality of distinct segments by being set during the live event prior to commencement of the respective segment.

2. The method of claim 1, wherein the integrating of the video content depicting the live event with the graphical representation of the instances of the predesignated feedback token includes overlaying the graphical representation onto the video content as a virtual augmentation that is viewable by the audience receiving the livestream content.

3. The method of claim 1, wherein:
the live event occurs in an event space featuring one or more human subjects and a video display that is depicted together with the one or more human subjects in the video content depicting the live event; and
the integrating of the video content depicting the live event with the graphical representation of the instances of the predesignated feedback token includes directing the video display to present the graphical representation.

4. The method of claim 1, wherein:
the generating of the graphical representation of the instances of the predesignated feedback token is performed by a first game engine;
the method further comprises generating, by a second game engine, an additional graphical representation associated with the live event; and
the generating of the livestream content is performed by a content compositor that receives graphics data from the first and second game engines and, based on the graphics data, integrates the video content with both the graphical representation of the instances of the predesignated feedback token and the additional graphical representation associated with the live event.

5. The method of claim 4, wherein:
the live event occurs in an event space featuring one or more human subjects and a video display that is depicted together with the one or more human subjects in the video content depicting the live event; and
the integrating, by the content compositor, of the video content with both the graphical representation and the additional graphical representation includes:
directing first graphical content to be presented by the video display in the event space, and
directing second graphical content different from the first graphical content to be overlayed onto the video content as a virtual augmentation.

6. The method of claim 1, wherein the tracking of the instances of the predesignated feedback token includes maintaining the current count of instances of the predesignated feedback token submitted by the audience, the current count incremented once for each audience feedback unit in which one or more instances of the predesignated feedback token are identified.

7. The method of claim 1, further comprising applying, beginning when the comparing indicates that the current count reaches the threshold value and throughout a remainder of the segment of the live event, a visual or audible effect to the livestream content.

8. The method of claim 1, wherein:
the live event is a musical presentation featuring performance of a set of musical pieces by an artist;
one or more musical pieces of the set of musical pieces is included in each of the plurality of distinct segments; and
the progression of levels corresponds to a narrative associated with a history of the artist or a theme of the musical presentation.

9. The method of claim 1, wherein the predesignated feedback token is a graphical element.

10. The method of claim 1, wherein the predesignated feedback token is a combination of one or more graphical and textual elements.

11. A system comprising:
one or more memory facilities storing instructions; and
one or more processors communicatively coupled to the one or more memory facilities and configured to execute the instructions to perform a process comprising:
providing, to an audience, livestream content depicting a live event and a feedback forum associated with the livestream content and by way of which feedback is submitted by the audience during the live event;
identifying and tracking, within the feedback submitted by the audience, instances of a predesignated feedback token;
generating a graphical representation of the instances of the predesignated feedback token;
generating the livestream content by integrating video content depicting the live event with the graphical representation of the instances of the predesignated feedback token;
comparing, in real time during a segment of the live event that is included in a plurality of distinct segments into which the live event is divided, a threshold value to a current count of instances of the predesignated feedback token that have been identified and tracked since the segment commenced; and
based on the comparing, integrating the threshold value and the current count with the livestream content so as to indicate to the audience when the current count reaches the threshold value,
wherein:
the plurality of distinct segments is associated with a progression of levels that the audience traverses by submitting, within each distinct segment, a sufficient count of instances of a respective predesignated feedback token to reach different respective threshold values set for each of the plurality of distinct segments; and
each of the different respective threshold values is set dynamically for its respective segment of the plurality of distinct segments by being set during the live event prior to commencement of the respective segment.

12. The system of claim 11, wherein:
a first memory facility of the one or more memory facilities and a first processor of the one or more processors are included in a first computing system configured as a distribution platform that performs the providing of the livestream content and the feedback forum;
a second memory facility of the one or more memory facilities and a second processor of the one or more processors are included in a second computing system configured as a feedback analyzer that performs the identifying of the instances of the predesignated feedback token;
a third memory facility of the one or more memory facilities and a third processor of the one or more processors are included in a third computing system configured as a game engine that performs the tracking of the instances of the predesignated feedback token and the generating of the graphical representation of the instances of the predesignated feedback token; and a fourth memory facility of the one or more memory facilities and a fourth processor of the one or more processors are included in a fourth computing system configured as a content compositor that performs the generating of the livestream content and that provides the livestream content to the distribution platform implemented by the first computing system.

13. The system of claim 11, wherein the integrating of the video content depicting the live event with the graphical representation of the instances of the predesignated feedback token includes overlaying the graphical representation onto the video content as a virtual augmentation that is viewable by the audience receiving the livestream content.

14. The system of claim 11, wherein:
the live event occurs in an event space featuring one or more human subjects and a video display that is depicted together with the one or more human subjects in the video content depicting the live event; and
the integrating of the video content depicting the live event with the graphical representation of the instances of the predesignated feedback token includes directing the video display to present the graphical representation.

15. The system of claim 11, wherein:
a first memory facility of the one or more memory facilities and a first processor of the one or more processors are included in a first computing system configured as a first game engine that performs the generating of the graphical representation of the instances of the predesignated feedback token;
a second memory facility of the one or more memory facilities and a second processor of the one or more processors are included in a second computing system configured as a second game engine that generates an additional graphical representation associated with the live event; and
a third memory facility of the one or more memory facilities and a third processor of the one or more processors are included in a third computing system configured as a content compositor that performs the generating of the livestream content by:
receiving graphics data from the first and second game engines, and
based on the graphics data, integrating the video content with both the graphical representation of the instances of the predesignated feedback token and the additional graphical representation associated with the live event.

16. A non-transitory computer-readable medium storing instructions that, when executed, direct a processor of a computing device to perform a process comprising:
providing, to an audience, livestream content depicting a live event and a feedback forum associated with the livestream content and by way of which feedback is submitted by the audience during the live event;
identifying and tracking, within the feedback submitted by the audience, instances of a predesignated feedback token;
generating a graphical representation of the instances of the predesignated feedback token;
generating the livestream content by integrating video content depicting the live event with the graphical representation of the instances of the predesignated feedback token,
comparing, in real time during a segment of the live event that is included in a plurality of distinct segments into which the live event is divided, a threshold value to a current count of instances of the predesignated feedback token that have been identified and tracked since the segment commenced; and
based on the comparing, integrating the threshold value and the current count with the livestream content so as to indicate to the audience when the current count reaches the threshold value,
wherein:
the plurality of distinct segments is associated with a progression of levels that the audience traverses by submitting, within each distinct segment, a sufficient count of instances of a respective predesignated feedback token to reach different respective threshold values set for each of the plurality of distinct segments; and
each of the different respective threshold values is set dynamically for its respective segment of the plurality of distinct segments by being set during the live event prior to commencement of the respective segment.

17. The non-transitory computer-readable medium according to claim 16, wherein:
the live event is a musical presentation featuring performance of a set of musical pieces by an artist;
one or more musical pieces of the set of musical pieces is included in each of the plurality of distinct segments; and
the progression of levels corresponds to a narrative associated with a history of the artist or a theme of the musical presentation.

18. The non-transitory computer-readable medium according to claim 16, wherein the process further comprises applying, beginning when the comparing indicates that the current count reaches the threshold value and throughout a remainder of the segment of the live event, a visual or audible effect to the livestream content.

19. The non-transitory computer-readable medium according to claim 16, wherein the predesignated feedback token is a graphical element.

20. The non-transitory computer-readable medium according to claim 16, wherein the predesignated feedback token is a combination of one or more graphical and textual elements.

* * * * *